United States Patent [19]

Carnes et al.

[11] Patent Number: 4,626,977
[45] Date of Patent: Dec. 2, 1986

[54] REGULATED POWER SUPPLY FOR VIDEO DISPLAY APPARATUS

[75] Inventors: Mark T. Carnes; Lawrence E. Smith, both of Indianapolis, Ind.

[73] Assignee: RCA Corporation, Princeton, N.J.

[21] Appl. No.: 813,757

[22] Filed: Dec. 27, 1985

[51] Int. Cl.[4] .......................................... H02M 3/335
[52] U.S. Cl. .......................................... 363/21; 363/97
[58] Field of Search .................... 363/20, 21, 41, 56, 363/97, 131; 315/411; 358/190; 361/92; 307/44

[56] References Cited

U.S. PATENT DOCUMENTS

| | | | |
|---|---|---|---|
| 3,660,749 | 5/1972 | Kadri | 363/41 X |
| 4,272,805 | 6/1981 | Iguchi et al. | 363/56 X |
| 4,315,303 | 2/1982 | Snyder | 363/21 |
| 4,459,651 | 7/1984 | Fenter | 363/97 X |
| 4,481,564 | 11/1984 | Balaban | 363/21 |

FOREIGN PATENT DOCUMENTS 2108296  5/1983  United Kingdom ................. 363/21

Primary Examiner—Patrick R. Salce
Assistant Examiner—Marc S. Hoff
Attorney, Agent, or Firm—Paul J. Rasmussen; Joseph Laks; Scott J. Stevens

[57] ABSTRACT

A video display apparatus includes a regulated transformer power supply that provides power to an external load device, such as a computer, via one winding on the power supply transformer. Operation of the video display apparatus without the external circuit attached may cause degradation of the other transformer winding load circuits due to insufficient transformer power transfer as a result of decreased external power supply loading. A diode is connected from the external load supply to another load circuit to supply power to the other load circuit when the external device is not attached. When the external device is attached, the diode is reverse biased and does not conduct.

8 Claims, 1 Drawing Figure

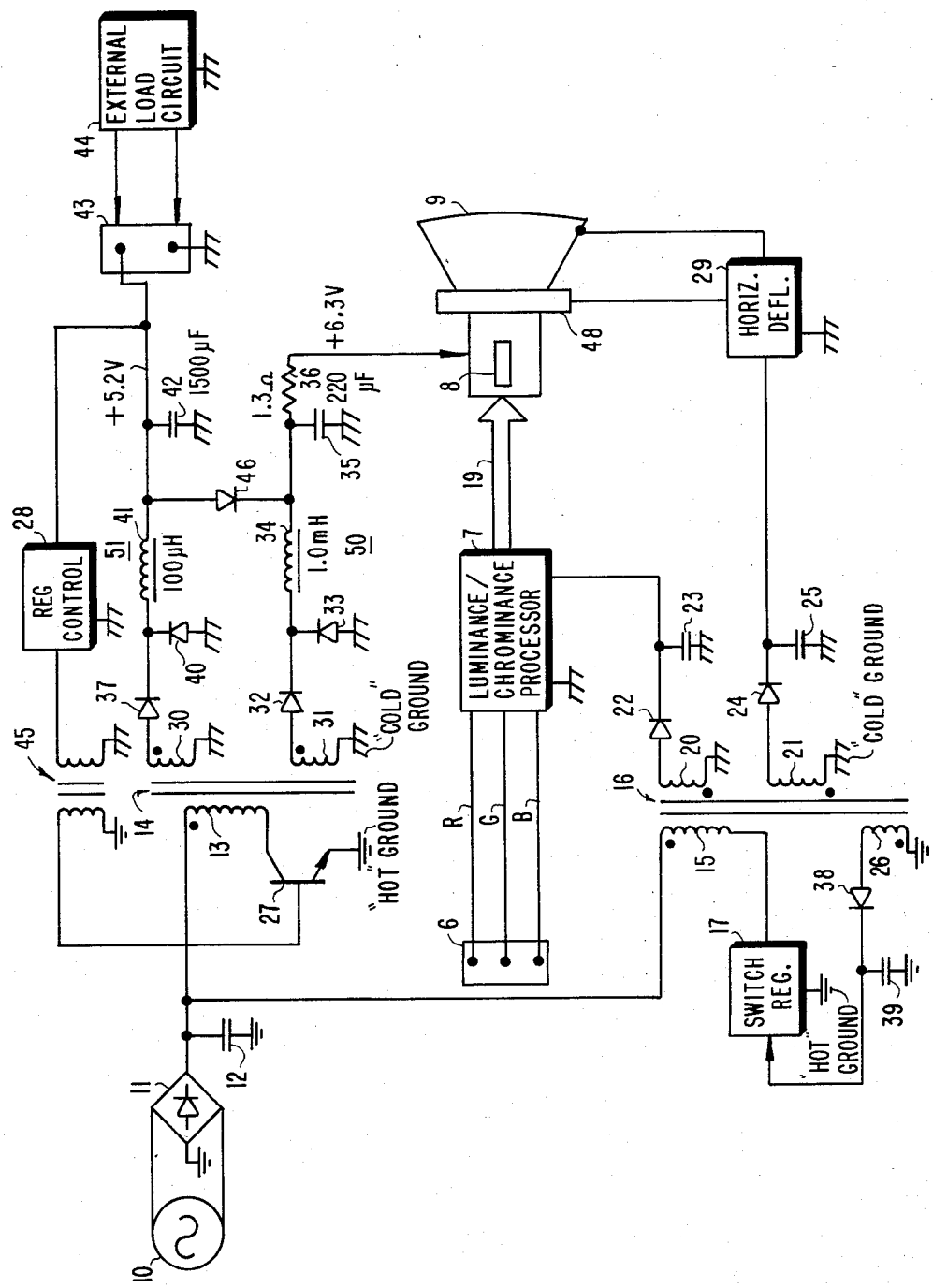

REGULATED POWER SUPPLY FOR VIDEO DISPLAY APPARATUS

This invention relates to power supplies for video display apparatus and, in particular, to regulation of power supplies subject to large variations in circuit loading.

Video display apparatus, such as television receivers and computer monitors, include various load circuits that require regulated supply voltages in order to operate properly. These supply voltages are provided by a power supply that may generate several different voltage levels. One conventional type power supply incorporates a transformer having a primary winding and one or more secondary windings to which the video display apparatus load circuits are connected. An unregulated voltage is periodically applied to the primary winding by action of a switching device. The interval of time during which the unregulated voltage is applied to the primary winding during each switching cycle is controlled. The magnitude of the voltages developed across the secondary windings are in proportion to the length of time the unregulated voltage is applied to the primary winding. Feedback from one of the secondary windings is used to control the operation of the primary winding switching device so that the supply voltages associated with the secondary windings are regulated.

When the video display apparatus is used as a computer monitor, for example, it may be desirable to provide a supply voltage that can be used to power a device external to the video display apparatus, such as a computer or related circuitry. Such a device may require extremely accurate voltage supply regulation and may place a large load on that supply; it is therefore appropriate to develop the regulator feedback signal from this supply. A problem with such an arrangement may occur when the video display apparatus is operated without the previously described external device attached. Since virtually no load is present when the external device is not attached, very little power is required from the primary winding to maintain the external device supply at its regulated level. Other video display apparatus load circuits, however, which continue to draw power, may cause their associated supply levels to decline. Since the regulator feedback signal is derived from the external device supply, such decline in other voltage supply levels is not compensated. In some instances, this situation may be severe enough that some load circuits may not operate properly.

A solution to this problem places a power dissipating resistor at the output of the external device supply. This preload resistor provides sufficient supply loading that, even with the external device not attached, the external device supply will require enough power from the primary winding that the other load circuit supplies are maintained at sufficient levels to insure proper operation of their associated load circuits. The previously described preload resistor, however, dissipates a significant amount of power, and consequently must be quite large. The result is that the efficiency of the power supply is reduced and both the manufacturing and operating costs are increased.

In accordance with an aspect of the present invention, a power supply for a video display apparatus comprises a source of unregulated voltage and a first transformer winding periodically energized from the source of unregulated voltage. A first circuit including a second winding develops a voltage that is regulated with respect to the unregulated voltage source and selectively supplies power to a first load circuit. A second circuit including a third winding is energized by the first winding. A second load circuit draws power from the second circuit. The power provided is insufficient to power the second load circuit when the first load circuit does not draw power from the first circuit. A switch is connected to the first circuit and the second load circuit and is responsive to the level of power provided by the second circuit for causing the switch to be in a first state when the power is below a predetermined level in order to supply power from the first circuit to the second load circuit. The switch is in a second state when the power is above the predetermined level to prevent power from being applied from the first circuit to the second load circuit.

In the accompanying drawing, the sole FIGURE is a block and schematic diagram of a portion of a video display apparatus incorporating a power supply in accordance with the present invention.

Referring to the FIGURE, video signals from a source of video information, such as a computer is applied to input terminals 6. The video signals, illustratively supplied as red, green and blue video signals, are applied to luminance and chrominance processing circuit 7 via conductors R, G and B. The luminance and chrominance processing circuit 7 generates color drive signals that are applied to an electron gun assembly 8 of a cathode ray tube 9 via a conductor designated 19.

A source of AC voltage 10 is coupled to a rectifying network 11 which develops an unregulated DC voltage across a capacitor 12. This unregulated voltage is applied to a winding 13 of a transformer 14 and to a winding 15 of a transformer 16. Current flow in winding 15 is illustratively controlled by a conventional switched-mode regulator circuit 17. The voltage developed across winding 15 by this current flow acts, by transformer action, to develop voltages across secondary windings 20, 21 and 26. The voltage developed across winding 20 is rectified by diode 22 and filtered by capacitor 23 to produce a DC supply voltage that illustratively supplies power to luminance and chrominance processing circuit 7. The voltage developed across winding 21 is rectified and filtered by a diode 24 and a capacitor 25, respectively, to produce a DC supply voltage that is illustratively applied to a horizontal deflection circuit 29. Horizontal deflection circuit 29 produces horizontal deflection current in the windings of a deflection yoke 48 located on cathode ray tube 9. Horizontal deflection circuit 29 also produces a high voltage potential of the order of 25 KV that is applied to the high voltage terminal of cathode ray tube 9. The voltage developed across winding 26 is rectified by a diode 38 and filtered by a capacitor 39 to develop a DC feedback voltage that is applied to regulator circuit 17. The feedback signal developed from the winding 26 voltage acts to control the current flow interval through primary winding 15 in such a manner that the DC voltages generated from the secondary winding voltages, for example, the voltages across capacitors 23 and 25, are regulated with respect to the unregulated voltage across capacitor 12. Transformer 16 also provides electrical isolation between secondary windings 20 and 21 and the associated load circuits and components connected thereto, such as the user accessible video signal input terminals 6, and the primary-connected components, such as the AC supply. This electrical isolation, defined as a maximum current that is allowed to flow between two isolated components or terminals, is illustrated by referencing appropriate circuits and components to "hot" ground or "cold" ground, each being designated with a particular symbol, as shown in the FIGURE.

Current flow through winding 13 of transformer 14 is controlled by the switching action of a switching transistor 27. Transformer 14 illustratively operates in a forward converter mode such that voltages are developed across secondary windings 30 and 31 when current flows in primary winding 13. With respect to secondary winding 31, current switching in winding 13 by transistor 27 causes current to flow alternately in diodes 32 and 33. In particular, when transistor 27 is conductive, current is flowing in winding 13. Current also flows in diode 32, storing energy in inductor 34. When transistor 27 is off, current flows in inductor 34 via diode 33. The duty cycle of transistor 27 will determine the average current flow through inductor 34. Current from inductor 34 charges capacitor 35 to develop a DC supply voltage that is illustratively applied to electron gun assembly 8 of cathode ray tube 9 via resistor 36 in order to supply the electron gun filament voltage, illustratively shown in the FIGURE as +6.3 volts.

In a similar manner, the voltage developed across winding 30 causes current to flow alternately in diodes 37 and 40 such that energy is stored in inductor 41. Current flow from inductor 41 charges capacitor 42 to develop a DC supply voltage illustratively shown in the FIGURE as +5.2 volts.

This +5.2 volt supply, designated 51, is shown as providing power, via a terminal 43, to an external load circuit 44, such as a computer or computer interface circuits. The operating requirements of external load circuit 44 are such that extremely accurate supply voltage regulation is necessary. Feedback is provided, therefore, from the output of power supply 51 to regulator control circuit 28. Regulator control circuit 28 provides switching signals via transformer 45 to the base of transistor 27 that control the duty cycle of transistor 27 in order to maintain regulation of power supply 51. Transformers 14 and 45 provide electrical isolation between the power supplies 50 and 51 and the source of AC voltage 10 in a manner similar to that performed by transformer 16.

When connected to power supply 51 of the video display apparatus via terminal 43, external load circuit 44 draws a significant amount of power from power supply 51, of the order of 3 Amps of current. The current flow through winding 13 controlled by the duty cycle of transistor 27 is therefore determined accordingly to maintain accurate regulation of external load circuit power supply 51. Transformer 14 is constructed so that regulation of power supply 51 with external load circuit 44 connected results in substantial regulation of the electron gun filament supply 50 provided from the voltage developed across winding 31.

When the external load circuit is absent, the external load circuit power supply 51 is no longer required to provide power. With essentially no loading on supply 51, regulation of the external load power supply 51 requires much less energy from primary winding 13 and consequently the conductive portion of the duty cycle of transistor 27 is decreased. The average DC current through inductor 34 also decreases, thereby reducing the available power of supply 50. This may result in insufficient power being provided to the electron gun filament circuit, which draws current of the order of 0.7 Amps. The loading of the filament circuit may discharge capacitor 35 to a level at which the electron gun assembly 8 of cathode ray tube 9 ceases to operate or operates in an inefficient or improper manner. The inclusion of a loading resistor at the output of supply 51 will allow sufficient energy to be transferred via transformer 14 to power the filament circuit whether external circuit 44 is present or not. This artificial loading of the supply, however, causes a significant amount of power to be dissipated in the loading resistor whenever the video display apparatus is operating, thereby decreasing the efficiency and increasing the cost of the video display apparatus.

In accordance with a novel aspect of the present invention, a diode 46 is coupled between power supplies 51 and 50 with its anode connected to supply 51 and its cathode connected to supply 50. Diode 46 operates as a switch in the following manner. During operation of the video display apparatus with an external load circuit 44 attached, the power requirements of external load circuit 44 are enough to maintain a duty cycle of transistor 27 and hence a current flow interval of winding 13 sufficient to transfer enough energy to winding 31 in order to insure that sufficient power is available to the electron gun filament circuit under normal operating conditions. The voltage developed across capacitor 35 under the previously described conditions is sufficient to reverse bias diode 46. In the circuit of the FIGURE, this voltage is of the order of +6.8 volts.

When external load circuit 44 is not attached, insufficient power is provided by supply 50 and the average DC current through inductor 34 is insufficient to maintain capacitor 35 charged to its desired voltage level. As previously described, the current requirement of the filament circuit, of the order of 0.7 Amps, will cause capacitor 35 to discharge. When capacitor 35 becomes discharged to a level sufficient to forward bias diode 46, current will flow from power supply 51 via diode 46 to charge capacitor 35 and provide power to the electron gun filament load circuit. Since the voltage level generated by supply 51 is extremely well regulated independent of circuit loading, the voltage across capacitor 35 will essentially be the voltage level of supply 51 less the voltage drop across diode 46. Although this voltage level is less than the desired operating voltage of supply 50, it is sufficient to maintain normal operation of the electron gun filament circuit. The video display apparatus therefore operates in a normal manner independent of the presence or absence of external load circuit 44. The electron gun filament operates from its own power supply when an external load circuit is attached to the video display apparatus, but will draw operating power from the external load circuit supply when the external circuit is absent. The previously described invention, therefore eliminates the need for an artificial loading resistor, yet provides normal operation of the video display apparatus under highly variable circuit loading conditions.

What is claimed is:

1. In a video display apparatus, a power supply for providing power to an external load circuit comprises:
a source of unregulated voltage;
a transformer primary winding;
first switching means having a controllable duty cycle for periodically energizing said transformer primary winding from said source of unregulated voltage;

first means comprising a first transformer secondary winding energized when said transformer primary winding is energized for developing a voltage thereacross, rectifying means for rectifying said voltage, and LC circuit means for smoothing said rectified voltage for developing a first DC voltage for providing power to said external load circuit when said external load circuit is connected to said video display apparatus;

second means comprising a second transformer secondary winding energized when said transformer primary winding is energized for developing a voltage thereacross, rectifying means for rectifying said voltage, and LC circuit means for smoothing said rectified voltage for developing a second DC voltage for powering a load circuit of said video display apparatus;

control means responsive to said first DC voltage for controlling said duty cycle of said switching means in order to regulate the level of said first DC voltage, said control means decreasing said duty cycle when said external load circuit is not connected to said video display apparatus such that the level of said second DC voltage decreases;

second switching means coupled to said first means and to said load circuit of said video display apparatus, said second switching means responsive to said second DC voltage for entering a first switching state when said level of said second DC voltage decreases below a predetermined level in order to apply power from said first means to said load circuit of said video display apparatus and entering a second switching state when said level of said second DC voltage is above said predetermined level in order to prevent power from being applied to said load circuit of said video display apparatus from said first means.

2. The arrangement defined in claim 1, wherein said first switching means comprises a transistor.

3. The arrangement defined in claim 1, wherein said second switching means comprises a diode.

4. A power supply comprising:
a source of unregulated voltage;
a transformer including a first transformer winding;
means for periodically energizing said first transformer winding from said source of unregulated voltage;

first circuit means including a second transformer winding energized by said first transformer winding, said first circuit means developing a first voltage regulated with respect to said source of unregulated voltage, said first circuit means selectively supplying power to a first load circuit;

second circuit means including a third transformer winding energized by said first transformer winding;

a second load circuit coupled to said second circuit means and drawing power therefrom, said power provided by said second circuit means being insufficient to operate said second load circuit when said first load circuit does not draw power from said first circuit means; and switching means coupled to said first circuit means and to said second load circuit, said switching means responsive to the level of said power provided by said second circuit means for causing said switching means to enter a first switching state when said level of said power provided is below a predetermined level for applying power from said first circuit means to said second load circuit and for causing said switching means to enter a second switching state when said level of said power provided is above said predetermined level for preventing said first circuit means from applying power to said second load circuit.

5. The arrangement defined in claim 4, wherein said switching means comprises a diode.

6. The arrangement defined in claim 5, wherein said second circuit means develops a second voltage having a level greater than said first voltage when said first circuit means is supplying power to said first load circuit.

7. The arrangement defined in claim 6, wherein said diode becomes conductive when said second voltage decreases below the level of said first voltage when said first circuit means does not supply power to said first load circuit.

8. The arrangement defined in claim 4, wherein said transformer and said energizing means comprise a switched mode power supply operated in the forward converter mode.

* * * * *